United States Patent [19]
Baker et al.

[11] Patent Number: 5,446,818
[45] Date of Patent: Aug. 29, 1995

[54] FIBER OPTIC CONNECTOR HAVING A SHIELDING APPARATUS FOR PROTECTING THE EXPOSED END OF A FIBER OPTIC

[75] Inventors: Glenn S. Baker, Studio City; David D. Chang, Encino; Fred P. Paulino, Westminster, all of Calif.

[73] Assignee: Cogent Light Technologies, Inc., Santa Clara, Calif.

[21] Appl. No.: 238,589

[22] Filed: May 5, 1994

[51] Int. Cl.$^6$ .......................... G02B 6/36; G02B 7/26
[52] U.S. Cl. ...................................... 385/78; 385/72; 385/81; 385/84; 385/90
[58] Field of Search ...................... 385/62, 72, 75, 78, 385/81, 84, 90, 92, 138

[56] References Cited

U.S. PATENT DOCUMENTS

| | | | |
|---|---|---|---|
| 4,573,760 | 3/1986 | Fan et al. | 385/62 |
| 4,673,242 | 6/1987 | Logan et al. | 385/84 |
| 4,679,895 | 7/1987 | Huber | 385/81 |
| 5,102,211 | 4/1992 | Slaney et al. | 385/81 |
| 5,134,677 | 7/1992 | Leung et al. | 385/81 |

*Primary Examiner*—Rodney B. Bovernick
*Assistant Examiner*—Robert E. Wise
*Attorney, Agent, or Firm*—Blakely, Sokoloff, Taylor & Zafman

[57] ABSTRACT

The present invention provides a fiber optic connector having a shielding apparatus for protecting the exposed end of a fiber optic. The shielding apparatus of the connector generally comprises a cylindrical housing, a collet, and a protective sleeve. The cylindrical housing comprises first and second ends and a through-hole for reception of a fiber optic having a fiber optic end protruding from the first end of the cylindrical housing. The collet comprises a tubular body with first and second ends and a through-hole passing between the ends for movable reception of the cylindrical housing, with the second end of the tubular body being split to form a plurality of prongs arranged coaxially with the through-hole of the collet. The tubular body also comprises an inner surface with an inner flange disposed proximate to the second end of the collet for contacting the second end of the cylindrical housing and an outer surface with first and second opposing shoulders defining a recess in the outer surface of the collet. The protective sleeve comprises first and second ends, a through-hole passing between the ends for movable reception of the collet and an inner surface having an inner flange for disposition within the recess of the outer surface of the collet. With this arrangement, the shielding apparatus can be placed in an unprotected mode to expose the fiber optic end when the sleeve and cylindrical housing are moved towards the first and second ends of the collet, respectively, or it can be placed in a protected mode to shield the fiber optic end when the sleeve and cylindrical housing are moved towards the second and first ends of the collet, respectively.

33 Claims, 3 Drawing Sheets

FIBER OPTIC CONNECTOR HAVING A SHIELDING APPARATUS FOR PROTECTING THE EXPOSED END OF A FIBER OPTIC

BACKGROUND Of THE INVENTION

1. Field of the Invention

The present invention relates to the field of optical transmission systems, and more specifically, to fiber optic connectors used to couple light between optical components.

2. Prior Art

In the field of fiber optics, the coupling of light into a fiber optic using high power coupling systems can result in thermal damage to the fiber optic. The light beam input to the fiber optic defines an acceptance angle with respect to the axis of the fiber optic such that light incident upon the fiber optic at an angle exceeding the acceptance angle will not be transmitted through the fiber optic, but will radiate the housing surrounding its input end. If the energy density at the focal point of collected light is great and a sufficient amount of light is incident at an unacceptable angle, then the surrounding portions of the housing will become hot enough to melt the cladding of the fiber optic.

In order to avoid thermal heating of the fiber optic, some coupling systems have been designed so as to protrude the input end of the fiber optic into the internal cavity of a light source housing in order to distance the focal point of light from the portions of the housing most likely to be irradiated. Yet, this arrangement requires the use of fiber optic connectors in which the input end of the fiber optic extends from the end of the connector, thereby exposing the fiber optic input end to physical damage resulting from accidental dropping or improper handling of the connector.

Additionally, the use of such connectors also requires that the fiber optic input end, the connector and the receiving block of the housing be precisely aligned in order to properly place the input end of the fiber optic at the center of the focal point of the collected light. Hence, an operator needs to be able to visually inspect the input end of the fiber optic to ensure that it extends from the connector at just the right length and is undamaged before it is inserted into the receiving block of the housing.

Accordingly, it would be advantageous to provide a fiber optic connector in which an exposed end of a fiber optic is protruded from the connector, with the connector having means for protecting the exposed fiber optic end while permitting visual inspection thereof and means for facilitating alignment of the connector and the receiving block during its insertion.

It is therefore an object of the present invention to provide a fiber optic connector having a shielding apparatus for protecting the input end of a fiber optic when the connector is not inserted into the receiving block of the housing.

It is another object of the present invention to provide a fiber optic connector having a shielding apparatus for protecting the input end of a fiber optic when not in use, but which unsheathes and exposes the fiber optic end automatically upon insertion of the connector into the receiving block of the housing.

It is a another object of the present invention to provide a fiber optic connector having a shielding apparatus for protecting the input end of a fiber optic, which apparatus further facilitates alignment of the connector and the fiber optic input end within the receiving block of the housing.

It is a further object of the present invention to provide a fiber optic connector as described above in which the fiber optic is secured within the connector without the use of adhesives which tend to melt and/or expand in high energy applications.

It is yet another object of the present invention to provide a fiber optic connector having a shielding apparatus for protecting the input end of a fiber optic, with the shielding apparatus being retractable to permit visual inspection of the fiber tip when the connector is not in use.

SUMMARY OF THE INVENTION

The present invention provides a fiber optic connector having a shielding apparatus for protecting the input end of a fiber optic when the connector is not in use, but which unsheathes and exposes the fiber optic end automatically upon insertion of the connector into the housing of an optical coupling system. The connector is preferably adapted for insertion into a light source housing for coupling light from the source into the fiber optic. A receiving block made from a high heat conductivity metal is attached to or formed in one of the housing walls for securing the connector to the housing. The receiving block comprises first and second ends and a through-hole passing between the ends for receiving the connector, and further comprises a locking mechanism for securing the connector within the block and a bushing for guiding the shielding apparatus of the connector into position.

The shielding apparatus comprises an elongated barrel or cylindrical housing having first and second ends and a through-hole passing between the ends for reception of the fiber optic, a collet having a tubular body with first and second ends and a through-hole passing between the ends for movable reception of the elongated barrel, and a protective sleeve having first and second ends and a through-hole passing between the ends for movable reception of the collet. Upon securing the fiber optic within the barrel, inserting the barrel within the collet and inserting the collet within the sleeve, the shielding apparatus can be manipulated to place it in either a first protected mode in which the fiber optic end is retracted within the through-hole of the collet or a second unprotected mode in which the fiber optic end protrudes from the collet.

In accordance with the preferred embodiment of the present invention, the shielding apparatus is further designed to automatically remain in the protected mode until the connector is inserted within the receiving block of the housing by means of springs implemented between the barrel and the collet and between the collet and the sleeve.

DETAILED DESCRIPTION OF THE INVENTION

The present invention provides a fiber optic connector having a shielding apparatus for shielding the exposed end of a fiber optic secured within the connector. In the following description, for purposes of explanation and not limitation, specific details are set forth, such as particular dimensions, numbers, optical components, etc. in order to provide a thorough understanding of the present invention. However, it will be apparent to one skilled in the art that the present invention may be practiced in other embodiments that depart from these specific details. In other instances, detailed descriptions of well-known elements, devices, characteristics and techniques are omitted so as not to obscure the description of the present invention with unnecessary details.

In accordance with the present invention, a fiber optic connector 8 made from a heat resistant material such as high temperature plastic or aluminum is provided for supporting the input end 4 of a fiber optic 2. The connector 8 comprises an elongated body having first and second ends with the second end being adapted with a shielding apparatus 1 for protecting the input end 4 of the fiber optic 2 when not in use.

Figure 1:
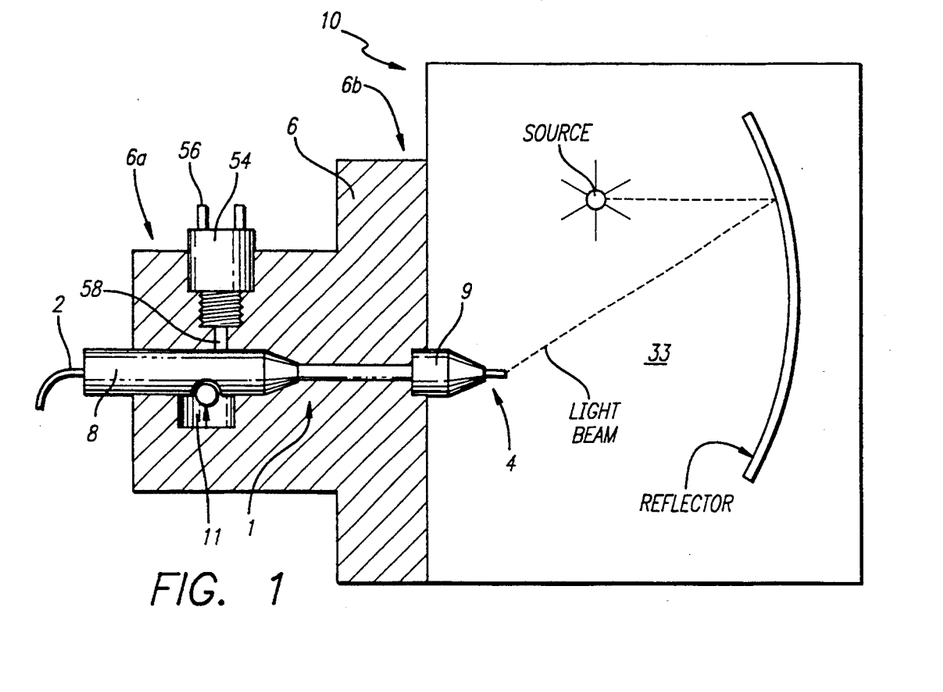
FIG. 1 is a generalized diagram of a light source housing having a receiving block for reception of a fiber optic connector and a bushing for supporting the protruded end of a fiber optic.
Figure 5:
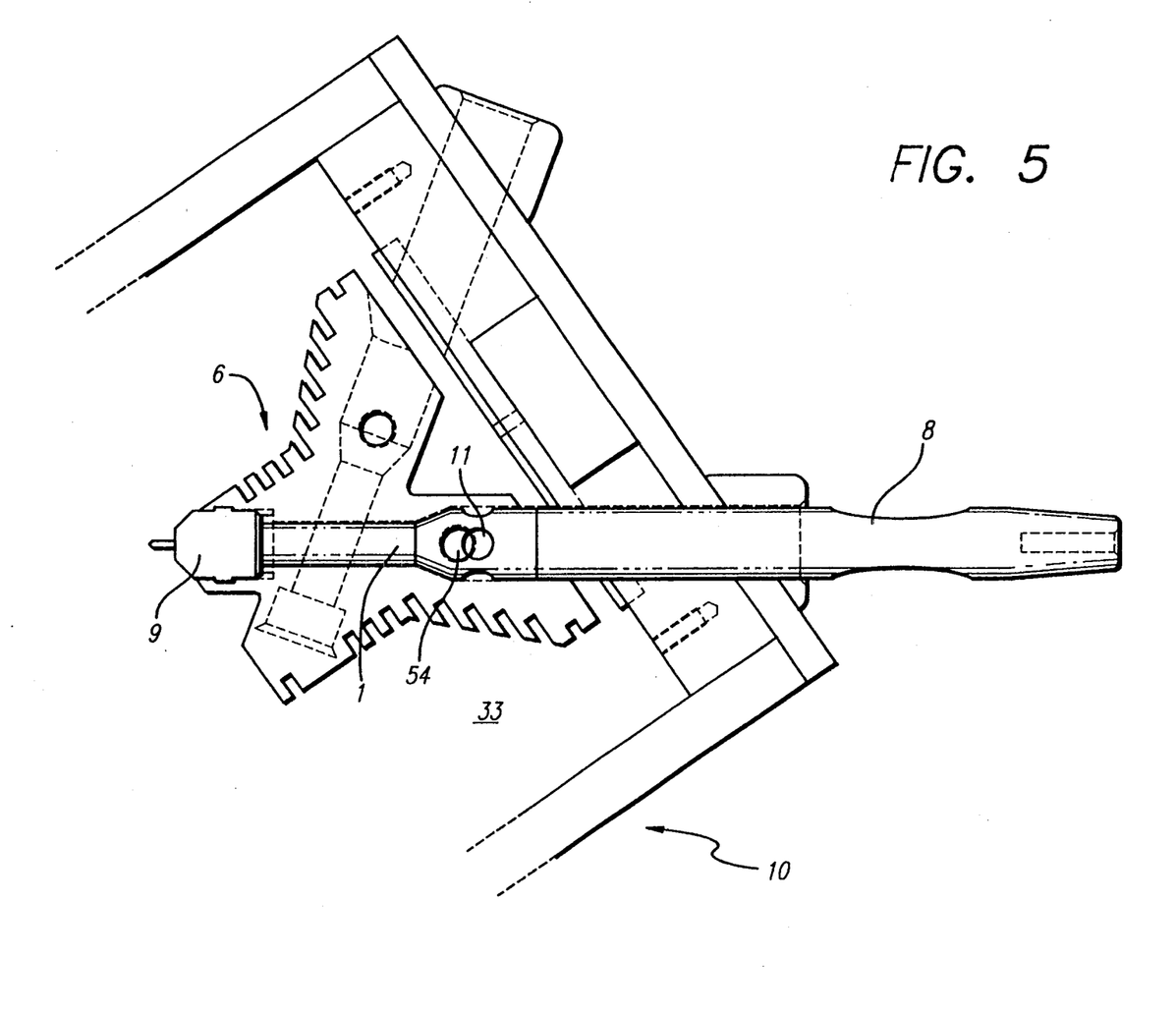
FIG. 5 is a top schematic view of the receiving block of a light source housing in accordance with the preferred embodiment of the present invention.

In terms of the system in which the connector 8 and fiber optic 2 are to be used, the connector 8 is preferably adapted for insertion into a light source housing 10 for coupling light from a source into the fiber optic 2. The source preferably comprises a compact xenon arc lamp with a one (1) mm arc length contained in an aspherical glass enclosure. As shown in FIGS. 1 and 5, the light source housing 10 comprises walls defining an internal cavity 33. A receiving block 6 made from a high heat conductivity metal (i.e., aluminum) is attached to or formed in one of the housing walls for securing the connector 8 to the housing 10. The receiving block 6 comprises first and second ends 6a, 6b and at least one through-hole passing between the ends for receiving the connector 8.

The receiving block 6 further comprises a locking mechanism 11 for securing the connector 8 within the block 6 and a contact or momentary push-button switch 54 for enabling the transmission of light through the fiber optic of the connector when the connector is properly inserted within the through-hole. As generally shown in FIG. 1, the locking mechanism 11 is disposed within the through-hole of the block 6 and preferably comprises a ball bearing that is spring-loaded into an arcuate seat of the block 6 for engagement with a corresponding arcuate recess in the body of the connector 8 upon insertion into the block 6. The pressure exerted on the arcuate recess of the connector 8 acts as a retaining force to maintain the connector's proper alignment within the receiving block 6.

With respect to the push-button switch 54 shown in FIG. 1, the switch 54 is disposed within the receiving block 6 such that the push-button 58 for activating the switch 54 extends into the through-hole of the block 6 to make contact with the body of the connector 8, while the leads 56 of the switch 54 extend outside of the block 6. The leads 56 are connected to circuitry of the light source's shutter (not shown) in order that the shutter remains off (or in a closed position) when the push-button 58 is not depressed and remains on (or in an open position) when the push-button 58 is depressed by its contact with the connector 8. In this manner, the push-button switch 54 acts as a safety mechanism for protecting a user's eyes by preventing light from entering the through-hole of the receiving block 6 (and passing through to the external working area) until the connector 8 is inserted. It is also noted that this may also be accomplished by coupling the leads 56 of the switch 54 to the power circuitry of the light source itself.

Referring again to FIG. 1, the housing 10 further comprises a bushing 9 made from a high heat conductivity metal, such as a nickel plated copper alloy, secured to the second end of the block 6. The bushing 9 has first and second ends 9a, 9b and an aperture 29 formed coaxially with the through-hole of the block 6 at its second end 9b to permit passage of the unsheathed fiber optic end 4 into the internal cavity 33 of the housing 10. The bushing 9 acts to guide the shielding apparatus 1 of the connector 8 into position within the bushing 9 such that the fiber optic end 4 is automatically unsheathed and accurately inserted through the aperture 29 and into the internal cavity 33 of the housing 10. Although in the preferred embodiment, the light source housing 10, receiving block 6 and bushing 9 form separate pieces for ease in manufacture and maintenance, the present invention will work just as well with housings in which these elements are integrally formed. In addition, the connector 8 and shielding apparatus 1 of the present invention may also be utilized with optical coupling components other than light sources which require at least one fiber optic 2 for coupling and/or transmitting light.

Furthermore, with respect to the fiber optic 2 used to couple light in the present invention, the fiber optic 2 preferably comprises a quartz core having a diameter ranging between 0.1 mm and 1.0 mm, a cladding consisting of an amorphous fluorocarbon comprising a 1,3-DIOXOLE,4,5-DIFLUORO,2,2-BIS(TRI-FLUOROMETHYL)-POLYMER with TETRA-FLUOROETHENE, and a silicone buffer. However, optical fibers or fiber bundles made from other conventional materials and having a diameter ranging from 0.1 and 10.0 mm may also be used without departing from the spirit of the present invention.

With respect to the shielding apparatus 1 of the present invention, the apparatus 1 comprises an elongated barrel or cylindrical housing 3 having first and second ends 3a, 3b and a through-hole passing between the ends for reception of the fiber optic 2. According to one embodiment, the elongated barrel 3 may itself form the entire fiber optic connector 8 by means of its first end 3a being extended in diameter and length suitable for securing the fiber optic 2 and for insertion into the receiving block 6. In the preferred embodiment shown in FIGS. 3 and 4, however, the barrel 3 is secured within the connector 8 by means of an outer flange 31 disposed proximate to its first end 3a for insertion into a detachable collar 21 of the connector 8.

Figure 3:
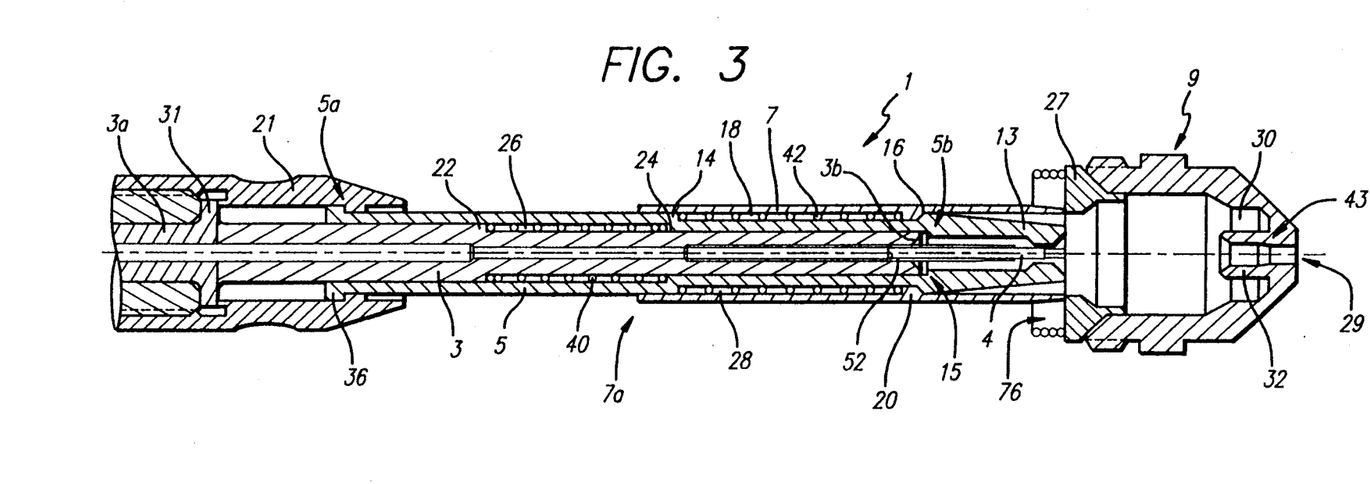
FIG. 3 is a schematic diagram of the shielding apparatus and bushing mount in accordance with the preferred embodiment of the present invention showing the shielding apparatus in the protected mode.
Figure 4:
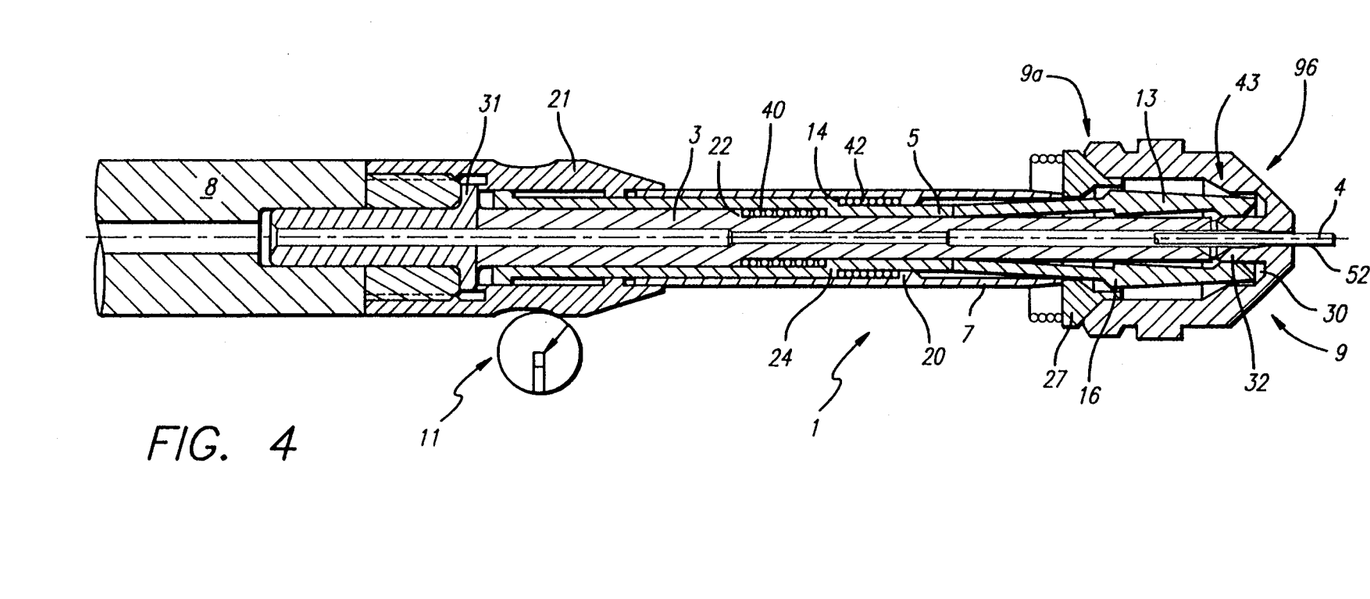
FIG. 4 is a schematic diagram of the shielding apparatus and bushing mount in accordance with the preferred embodiment of the present invention showing the shielding apparatus in the unprotected mode.

With this arrangement, the fiber optic 2 is first inserted into a metallic reception tube 52 that acts as a fiber support, then into the first end of the connector 8 and finally through the through-hole of the barrel 3 until a predetermined length of the fiber optic 2 protrudes from the second end 3b of the barrel 3. The fiber optic 2 is secured to both the barrel 3 and connector 8 by means of crimping the reception tube 52 down onto the fiber optic 2 over a sizable portion of its length and press fitting the tube into the first end of the connector 8. In this manner, the use of adhesives to secure the respective components together need not be used so as to avoid the problems of melting and/or the expansion of the adhesive materials, thereby causing the components to become loose and/or misaligned.

The shielding apparatus 1 further comprises a collet 5 having a tubular body with first and second ends 5a, 5b and a through-hole passing between the ends for movable reception of the elongated barrel 3. The second end 5b of the collet 5 is split to form a plurality of prongs 13 arranged coaxially with the through-hole of the collet 5. The collet 5 also comprises an outer surface with first and second opposing shoulders 14, 16 defining a recess 18 in the outer surface of the collet 5 and an inner surface having a first circumferential inner flange 15 disposed proximate to the second end 5b of the collet 5 for contacting the second end 3b of the barrel 3 upon its insertion into the collet 5. In order to secure the collet 5 to the barrel 3, the first end 5a of the collet 5 is adapted with a stop member 36 which is inserted within a hollow of the connector collar 21 to enable the collet 5 to move back and forth on top of the barrel 3 within the restraints of the hollow. Additionally, the shielding apparatus 1 also comprises a protective sleeve 7 having first and second ends 7a, 7b, a through-hole passing between the ends for movable reception of the collet 5 and an inner surface having a circumferential inner flange 20 for disposition within the recess of the collet 5.

Upon securing the fiber optic 2 within the barrel 3, inserting the barrel 3 within the collet 5 and inserting the collet 5 within the sleeve 7, the shielding apparatus 1 can be manipulated to place it in one of two modes:

1) a first protected mode in which the fiber optic end 4 is retracted within the through-hole of the collet 5 by moving the collet 5 towards the second end 3b of the barrel 3 (preferably placing the second end 3b of the barrel 3 adjacent to the first inner flange 15 of the collet 5) and moving the sleeve 7 towards the second end 5b of the collet 5 to cover and lock the prongs 13 of the collet 5 in position such that the fiber end 4 is protected, and 2) a second unprotected mode in which the fiber optic end 4 protrudes from the collet 5 by moving the sleeve 7 towards the first end 5a of the collet 5 to uncover the prongs 13 and moving the collet 5 towards the first end 3a of the barrel 3 to expose the fiber optic end 4 by means of the second end 3b of the barrel 3 contacting the inner flange 15 of the collet 5 to force the prongs 13 apart so that the barrel 3 can be moved further towards the second end 5b of the collet 5 to protrude the fiber optic end 4.

As should be apparent from the construction of the shielding apparatus 1 set forth above, when in the protected mode, the prongs 13 of the collet 5 are kept close together by means of the sleeve 7 acting as a locking mechanism. With the prongs 13 in a closed position, the first end 3a of the barrel 3 is prevented from moving past the inner flange 15 disposed on the inner surface of the collet 5. However, when in the unprotected mode, the sleeve 7 is moved back to uncover the prongs 13 of the collet 5 such that a force applied between the second end 3b of the barrel 3 and the inner flange 15 of the collet 5 causes the prongs 13 of the collet 5 to separate, thereby permitting the barrel 3 to move further towards the second end 5b of the collet 5 and expose the fiber optic end 4. Although the movement referred to between the respective components of the shielding apparatus 1 preferably comprises a sliding action, it is envisioned that other types of movement (such as rotation by means of corresponding threads) may also be implemented to achieve the same or similar operation as described above.

Furthermore, in accordance with the preferred embodiment of the present invention, the shielding apparatus 1 is further designed to automatically remain in the protected mode until the connector 8 is inserted within the receiving block 6 of the housing 10. This is accomplished through the use of springs 40, 42 implemented between the barrel 3 and the collet 5 and between the collet 5 and the sleeve 7. In this embodiment, the barrel 3 is further adapted with an outer flange 22 disposed on its outer surface proximate to the first end 3a of the barrel 3, while the inner surface of the collet 5 is further adapted with a second inner flange 24 disposed intermediate to the first and second ends 5a, 5b of the collet 5. With this particular construction, a first spring 40 is then placed between the outer flange 22 of the barrel 3 and the second inner flange 24 of the collet 5 to bias the collet 5 towards the second end 3b of the barrel 3, while a second spring 42 is placed between the first shoulder 14 of the collet 5 and the inner flange 20 of the sleeve 7 to bias the sleeve 7 towards the second end 5b of the collet 5. In this way, the springs act collectively to keep the barrel 3 retracted within the collet 5 and keep the sleeve 7 disposed over the prongs 13 of the collet 5 so that an object impacting upon the second end 5b of collet 5 will not make contact with the fiber optic end 4 which is protected by the prongs 13 sheathed within the sleeve 7.

Figure 2:
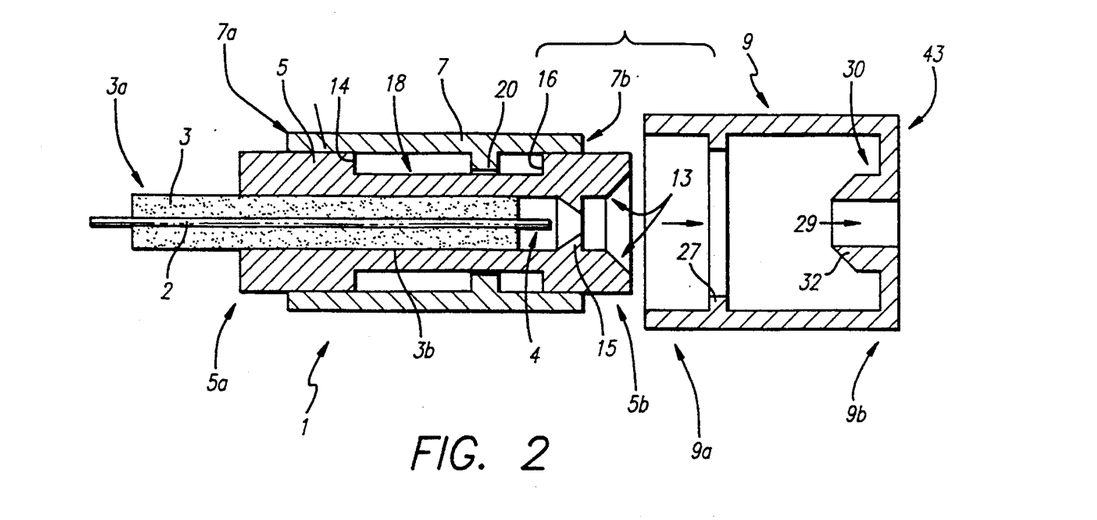
FIG. 2 is a generalized schematic diagram of a shielding apparatus for a connector and a bushing mount or housing member for receiving the apparatus.

In order to place the shielding apparatus 1 in the unprotected mode and expose the fiber optic end 4 upon insertion of the connector 8 into the receiving block 6 of the housing 10, a stop member 27 (shown in FIGS. 2–4) preferably forming a stop washer is disposed between the second end 6b of the receiving block 6 and the first end 9a of the bushing 9 for preventing passage of the sleeve 7 beyond the stop member 27 upon insertion of the shielding apparatus 1 into the bushing 9. In this embodiment, the bushing 9 further comprises a sidewall 43 disposed perpendicular to the through-hole of the receiving block 6 at the second end 9b of the bushing 9, with the sidewall 43 having an aperture 29 concentric with the through-hole to enable passage of the fiber optic end 4 into the internal cavity 33 of the light source housing 10. A circular groove 30 is formed in the sidewall 43 concentric with the aperture 29 for receiving the prongs 13 of the collet 5 upon insertion of the connector 8 into the light source housing 10. Additionally, a circular ridge 32 having tapered edges or contact surfaces is provided between the aperture 29 and the circular groove 30 to assist in accurately guiding the prongs 13 into the circular groove 30 and the fiber optic end 4 into the aperture 29 of the bushing 9. Finally, the bushing 9 is further adapted with ventilation holes penetrating through the sidewall 43 and into the circular groove 30 to assist in dissipating the heat generated in the bushing 9 by means of the light incident on its second end 9b.

It will be recognized that the above described invention may be embodied in other specific arrangements and may be used with a plurality of fiber optic couplers and/or connectors without departing from the spirit or essential elements of this disclosure. Thus, it is understood that the invention is not to be limited by the foregoing illustrative details, but rather is to be defined by the appended claims.

I claim:

1. A fiber optic connector comprising:
   a housing having first and second ends and a through-hole for reception of a fiber optic having a fiber optic end protruding from the second end of the cylindrical housing;
   a first sleeve with first and second ends and a through-hole passing between the ends for movable reception of the housing, with the first sleeve being biased towards the second end of the housing to sheathe the fiber optic end;
   a second sleeve with first and second ends and a through-hole passing between the ends for movable reception of the first sleeve, with the second sleeve being biased towards the second end of the first sleeve to lock the first sleeve in position over the fiber optic end; and
   wherein movement of the second sleeve towards the first end of the first sleeve unlocks the first sleeve and causes the first sleeve to move towards the first end of the housing to unsheathe the fiber optic end.

2. The apparatus of claim 1, wherein the first and second sleeves are biased towards the second end of the housing and the second end of the first sleeve, respectively, by axially mounting a first spring on the housing between an outer flange of the housing and an inner flange of the first sleeve and axially mounting a second spring on the first sleeve between an outer flange of the first sleeve and an inner flange of the second sleeve.

3. The fiber optic connector of claim 1, wherein the connector is adapted for insertion into a light source housing having walls defining an internal cavity, the light source housing having a receiving block secured to a wall of the light source housing with a first input end, a second output end and a through-hole passing between the ends of the receiving block for reception of the connector.

4. The fiber optic connector of claim 3, wherein the receiving block comprises a momentary push-button switch for enabling the transmission of light through the through-hole of the receiving block when the switch is on, the switch having leads electrically coupled to a shutter of the light source and a push-button protruding into the through-hole of the receiving block for contacting the connector and turning both the switch and the shutter on when the connector is inserted into the receiving block.

5. The fiber optic connector of claim 3, wherein the connector housing comprises an arcuate recess and the receiving block comprises a seat formed in a surface of the through-hole of the receiving block with a ball bearing spring loaded into the seat, the ball bearing engaging the arcuate recess of the connector housing upon insertion of the connector into the receiving block to lock the connector in position within the receiving block.

6. The fiber optic connector of claim 3, wherein the light source housing further comprises a bushing having first and second ends with the first end of the bushing being fastened to the second output end of the receiving block, the light source housing further comprising a stop member disposed between the second end of the receiving block and the bushing for preventing passage of the second sleeve beyond the stop member upon insertion of the connector into the light source housing.

7. The fiber optic connector of claim 6, wherein the bushing further comprises a sidewall disposed perpendicular to the through-hole of the receiving block at the second end of the bushing, the sidewall having an aperture concentric with the through-hole to enable passage of the fiber optic end into the internal cavity of the light source housing, a circular groove formed in the sidewall concentric with the aperture for receiving the second end of the first sleeve upon insertion of the connector into the light source housing and a circular ridge formed between the aperture and the circular groove.

8. The fiber optic connector of claim 7, wherein insertion of the connector into the through-hole of the receiving block causes the second sleeve to be moved towards the first end of the first sleeve upon contact with the stop member of the light source housing to unsheathe the second end of the first sleeve while the second end of the first sleeve and the fiber optic end are guided into the circular groove and the aperture of the bushing, respectfully, upon contact between the second end of the first sleeve and the circular ridge.

9. A shielding apparatus for use with a fiber optic connector to protect an exposed end of a fiber optic, the connector having a body with first and second ends and a through-hole passing between the ends for reception of the fiber optic such that the fiber optic end protrudes from the second end of the connector, the apparatus comprising:
   an elongated barrel for reception of the fiber optic such that the fiber optic end protrudes from the second end of the barrel, the barrel being secured to the second end of the connector;
   a first sleeve with first and second ends and a through-hole passing between the ends for movable reception of the barrel;
   a second sleeve with first and second ends and a through-hole passing between the ends for movable reception of the first sleeve; and
   wherein the barrel is non-removable disposed within the first sleeve and the first sleeve is non-removable disposed within the second sleeve, with the first and second sleeves being movable relative to one another and relative to the barrel to unsheathe the fiber optic end when the first and second sleeves are moved towards the first end of the barrel and to sheathe the fiber optic end when the first and second sleeves are moved towards the second end of the barrel.

10. The apparatus of claim 9, wherein movement of the second sleeve towards the second end of the first sleeve prevents the first sleeve from moving relative to the barrel to place the apparatus in a locked position in which the fiber optic end is sheathed by the first sleeve.

11. The apparatus of claim 10, wherein movement of the second sleeve towards the first end of the first sleeve causes the first sleeve to move towards the first end of the barrel to place the apparatus in an unlocked position and unsheathe the fiber optic end.

12. The apparatus of claim 10, wherein the apparatus is maintained in a locked position by axially mounting a first spring on the barrel between an outer flange of the barrel and an inner flange of the first sleeve and axially mounting a second spring on the first sleeve between an outer flange of the first sleeve and an inner flange of the second sleeve such that both the first and second sleeves are biased towards the second end of the barrel.

13. A shielding apparatus for use with a fiber optic connector to protect an exposed end of a fiber optic secured within the connector, the connector having a body with a through-hole for passage of the fiber optic end, the apparatus comprising:
an elongated barrel having first and second ends and a through-hole for reception of the fiber optic such that the fiber optic end protrudes from the second end of the barrel;
a collet having a tubular body with first and second ends and a through-hole passing between the ends for movable reception of the barrel, the second end of the tubular body being split to form a plurality of prongs arranged coaxially with the through-hole of the collet, the tubular body having an inner surface with an inner flange disposed proximate to the second end of the collet for contacting the second end of the barrel and an outer surface with first and second opposing shoulders defining a recess in the outer surface of the collet;
a protective sleeve having first and second ends, a through-hole passing between the ends for movable reception of the collet and an inner surface having an inner flange for disposition within the recess of the outer surface of the collet; and
wherein the collet and sleeve are movable relative to one another and relative to the barrel to unsheathe the prongs from the sleeve and expose the fiber optic end when the shielding apparatus is placed in an unprotected mode and to retract the fiber optic end and sheath the prongs in the sleeve when the shielding apparatus is in a protected mode.

14. The apparatus of claim 13, wherein to place the shielding apparatus in the unprotected mode the sleeve is moved towards the first end of the collet to unsheathe the prongs while the collet is moved towards the first end of the barrel to force the prongs apart and expose the fiber optic end upon contact between the second end of the barrel and the inner flange of the collet, and to place the shielding apparatus in the protected mode the collet is moved towards the second end of the barrel to close the prongs around the fiber optic end while the sleeve is moved towards the second end of the collet to keep the prongs together.

15. The apparatus of claim 13, wherein the relative movement between the barrel, the collet and the sleeve is enabled by one of sliding and rotating the barrel, the collet and the sleeve with respect to each other.

16. The apparatus of claim 13, wherein the apparatus is automatically maintained in the protected mode through the use of springs implemented between the barrel and the collet and between the collet and the sleeve.

17. The apparatus of claim 16, wherein the barrel comprises an outer surface having an outer flange disposed proximate to the first end of the barrel and the inner surface of the collet comprises a second inner flange disposed intermediate to the first and second ends of the collet, and wherein the springs comprise a first spring disposed between the outer flange of the barrel and the second inner flange of the collet and a second spring disposed between the first shoulder of the collet and the inner flange of the sleeve.

18. The apparatus of claim 13, wherein the apparatus further comprises a collar for securing the first end of the barrel to the connector and for movably fastening the collet to the connector.

19. A fiber optic connector comprising:
a cylindrical housing having first and second ends and a through-hole for reception of a fiber optic having a fiber optic end protruding from the second end of the cylindrical housing;
a collet having a tubular body with first and second ends and a through-hole passing between the ends for movable reception of the cylindrical housing, the second end of the tubular body being split to form a plurality of prongs arranged coaxially with the through-hole of the collet, the tubular body having an inner surface with an inner flange disposed proximate to the second end of the collet for contacting the second end of the cylindrical housing and an outer surface with first and second opposing shoulders defining a recess in the outer surface of the collet;
a protective sleeve having first and second ends, a through-hole passing between the ends for movable reception of the collet and an inner surface having an inner flange for disposition within the recess of the outer surface of the collet; and
wherein the collet and sleeve are movable relative to one another and relative to the cylindrical housing to unsheathe the prongs from the sleeve and expose the fiber optic end when the shielding apparatus is placed in an unprotected mode and to retract the fiber optic end and sheath the prongs in the sleeve when the shielding apparatus is in a protected mode.

20. The fiber optic connector of claim 19, wherein to place the shielding apparatus in the unprotected mode the sleeve is moved towards the first end of the collet to unsheathe the prongs while the collet is moved towards the first end of the cylindrical housing to force the prongs apart and expose the fiber optic end upon contact between the second end of the cylindrical housing and the inner flange of the collet, and to place the shielding apparatus in the protected mode the collet is moved towards the second end of the cylindrical housing to close the prongs around the fiber optic end while the sleeve is moved towards the second end of the collet to keep the prongs together.

21. The fiber optic connector of claim 19, wherein the relative movement between the cylindrical housing, the collet and the sleeve is enabled by one of sliding and rotating the cylindrical housing, the collet and the sleeve with respect to each other.

22. The fiber optic connector of claim 19, wherein the apparatus is automatically maintained in the protected mode through the use of springs implemented between the cylindrical housing and the collet and between the collet and the sleeve.

23. The fiber optic connector of claim 22, wherein the cylindrical housing comprises an outer surface having an outer flange disposed proximate to the first end of the cylindrical housing and the inner surface of the collet comprises a second inner flange disposed intermediate to the first and second ends of the collet, and wherein the springs comprise a first spring disposed between the outer flange of the cylindrical housing and the second inner flange of the collet and a second spring disposed between the first shoulder of the collet and the inner flange of the sleeve.

24. The fiber optic connector of claim 19, wherein the fiber optic connector further comprises a collar for movably fastening the first end of the collet to the cylindrical housing.

25. The fiber optic connector of claim 19, wherein the connector is adapted for insertion into a receiving block having
- a first input end,
- a second output end,
- a through-hole passing between the ends for reception of the connector, a sidewall disposed perpendicular to the through-hole at the second end of the receiving block having an aperture concentric with the through-hole to enable passage of the fiber optic end, a circular groove formed in the sidewall concentric with the aperture for receiving the prongs of the collet and a circular ridge formed between the aperture and the circular groove, and
- a stop member disposed proximate to the sidewall between the sidewall and the first end of the receiving block to inhibit passage of the sleeve beyond the stop member upon insertion of the connector.

26. The fiber optic connector of claim 25, wherein insertion of the connector within the through-hole of the receiving block causes the sleeve to be moved towards the first end of the collet upon contact with the stop member of the receiving block to unsheathe the prongs of the collet while the prongs of the collet and the fiber optic end are guided into the circular groove and the aperture of the receiving block, respectfully, upon contact between the prongs and the circular ridge.

27. The fiber optic connector of claim 26, wherein both the prongs and the circular ridge are adapted with corresponding inclined contact surfaces to enable relative movement between the prongs and the circular ridge perpendicular to the through-hole of the receiving block upon insertion of the connector.

28. The fiber optic connector of claim 25, wherein the connector is adapted for insertion into the housing of a light source having walls defining an internal cavity, the housing having a receiving block with a first input end, a second output end and a through-hole passing between the ends of the receiving block for reception of the connector.

29. The fiber optic connector of claim 28, wherein the housing of the light source further comprises a bushing having first and second ends with the first end of the bushing being fastened to the second output end of the receiving block, and a stop member disposed between the second end of the receiving block and the bushing for preventing passage of the sleeve beyond the stop member upon insertion of the connector into the housing.

30. The fiber optic connector of claim 29, wherein the bushing further comprises a sidewall disposed perpendicular to the through-hole of the receiving block at the second end of the bushing, the sidewall having an aperture concentric with the through-hole to enable passage of the fiber optic end into the internal cavity of the light source housing, a circular groove formed in the sidewall concentric with the aperture for receiving the prongs of the collet upon insertion of the connector into the light source housing and a circular ridge formed between the aperture and the circular groove.

31. The fiber optic connector of claim 30, wherein insertion of the connector into the through-hole of the receiving block causes the sleeve to be moved towards the first end of the collet upon contact with the stop member of the light source housing to unsheathe the prongs of the collet while the prongs of the collet and the fiber optic end are guided into the circular groove and the aperture of the bushing, respectfully, upon contact between the prongs and the circular ridge.

32. The fiber optic connector of claim 31, wherein both the prongs and the circular ridge are adapted with corresponding inclined contact surfaces to enable relative movement between the prongs and the circular ridge perpendicular to the through-hole of the receiving block upon insertion of the connector.

33. The fiber optic connector of claim 32, wherein the bushing of the light source housing comprises at least one ventilation hole passing through the sidewall of the bushing into the internal cavity of the light source housing.

* * * * *

UNITED STATES PATENT AND TRADEMARK OFFICE
CERTIFICATE OF CORRECTION

| | | |
|---|---|---|
| PATENT NO. | : | 5,446,818 |
| DATED | : | August 29, 1995 |
| INVENTOR(S) | : | Baker et al. |

It is certified that error appears in the above-identified patent and that said Letters Patent is hereby corrected as shown below:

On the title page,
    In item [73] delete "Santa Clara, Calif." and insert
    --Santa Clarita, Calif.--

Signed and Sealed this

Sixteenth Day of January, 1996

Attest:

BRUCE LEHMAN

*Attesting Officer*      *Commissioner of Patents and Trademarks*